No. 751,017. PATENTED FEB. 2, 1904.
W. N. RUMELY.
THRESHER TOOTHING.
APPLICATION FILED FEB. 8, 1902.
NO MODEL.
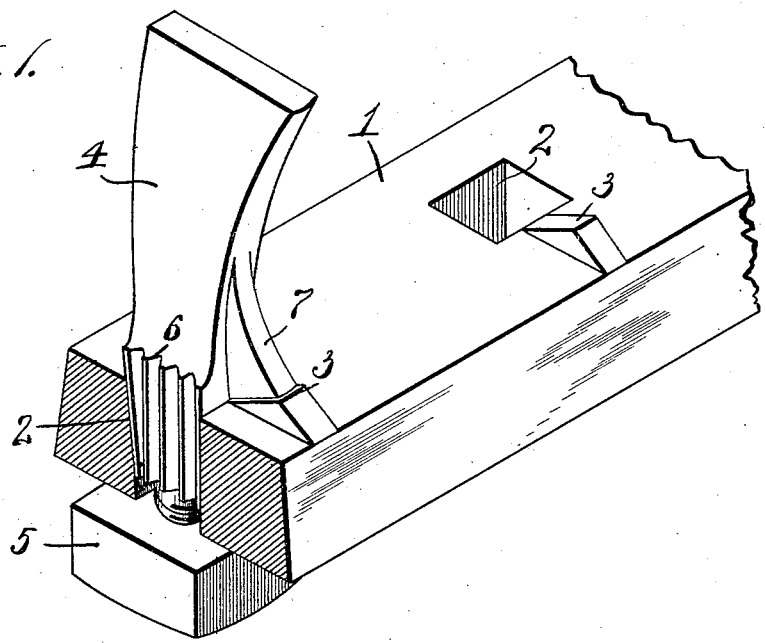
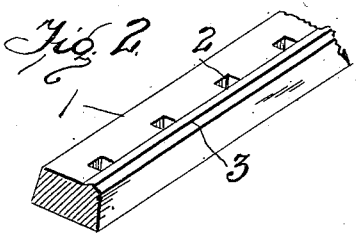
Witnesses:
Inventor
William N. Rumely
by James W. See
Attorney No. 751,017.

Patented February 2, 1904.

UNITED STATES PATENT OFFICE.

WILLIAM N. RUMELY, OF LAPORTE, INDIANA.

THRESHER-TOOTHING.

SPECIFICATION forming part of Letters Patent No. 751,017, dated February 2, 1904.

Application filed February 8, 1902. Serial No. 93,127. (No model.)

*To all whom it may concern:*

Be it known that I, WILLIAM N. RUMELY, a citizen of the United States, residing at Laporte, Laporte county, Indiana, (post-office address Laporte, Indiana,) have invented certain new and useful Improvements in Thresher-Toothing, of which the following is a specification.

This invention, pertaining to the toothing of threshing-machines at the cylinder or the concave, or both, will be readily understood from the following description, taken in connection with the accompanying drawings, which is a perspective view illustrating my improved toothing.

In the drawings, Figure 1 is a perspective view, partly broken away and partly in cross-section, illustrating a tooth and bar to which I have applied my invention. Fig. 2 is a perspective view of a modified form of bar.

1 indicates one of the tooth-holding bars of a thresher; 2, the tooth-holding mortises therein, formed as usual—that is to say, of rectangular outline and having an inwardly-reducing taper; 3, a projection standing above the face of the bar to the rear of each mortise and presenting a beveled surface sloping upwardly and rearwardly from the top of the rear wall of the mortise; 4, the tooth, whose active body portion and shank and stem are to be, generally considered, as usual—that is to say, the body portion is to have any usual or preferred beating form, its shank is adapted to fit the receiving-mortise in the bar, and the stem is adapted to receive a securing-nut at the back of the bar; 5, the usual nut engaging the stem of the tooth at the back of the bar and securing the tooth to the bar; 6, corrugations at the side faces of the shank of the tooth where the same engages the side walls of the mortise in the bar, these corrugations preferably extending longitudinally of the shank and endowing the side faces of the shank with a number of longitudinal ribs, presenting comparatively sharp edges to the side walls of the mortise, and 7 a brace upon the rear portion of the body of the tooth and projecting therefrom over the projection 3 on the bar and having a face presenting to the projection and beveled to fit the beveled face of the projection.

The tooth is to be driven into its mortise tightly, as usual, and secured therein by its nut. The shank of the tooth is to be formed with slightly-excessive width as compared with the width of the mortise, so that in the act of driving the tooth home in the bar the ribs 6 on the shank will necessarily be compressed and upset somewhat. When the tooth is driven home, the brace 7 bears against the projection 3, the bevel of the engaging surfaces of brace and projection being such as to properly resist the rearward working strain upon the tooth and greatly enhance the working stiffness of the tooth. The crushing capacity of the ribs 6 not only permits of an exceedingly intimate or close fitting of the sides of the shank against the side walls of the mortise, but at the same time permits of the tooth being driven fairly home in spite of those slight variations in the dimensions of shanks and mortises which are bound to occur in any ordinary process of manufacture. While it may be the design to have mortises uniform and tooth-shanks uniform, it is in practice always found that variations exist, requiring with ordinary teeth the sorting out or selecting of individual teeth with shanks adapted to fit individual mortises. With the present construction the crushing of the ribs on the shanks compensates for this variation.

The projections 3 manifestly perform, in conjunction with the braces 7, only at each tooth, and consequently need to be present only at each mortise in the bar; but if the intervals between them involve difficulties in manufacture, as would be the case in roll-bars, there is no objection to these projections forming a continuous rib along the bar. Indeed, such rib would be of utility in strengthening the bar.

I claim as my invention—

1. In thresher-toothing, the combination, substantially as set forth, of a tooth having a tapering shank with yieldable corrugated side faces adapted to present ribs to the side walls of its receiving-mortise to be upset by impingement thereagainst as driven in said mortise, and a nut screwing upon the stem of the tooth.

2. The combination of a tooth-holding bar provided with tapering rectangular mortises and a brace-receiving surface rising upwardly from the base of the mortises above the general surface of the bar, teeth with tapering shanks, yieldable corrugated side faces and rearwardly-projected braces adapted to engage the brace-receiving surface of the bar, and nuts screwing on the stems of the teeth.

3. In thresher-toothing, the combination of a tooth having a tapering shank with yieldable corrugated opposite side faces slightly in excess of the receiving-mortise adapted to present ribs to the side walls of said mortise to be upset by impinging therein, and a bar provided with a receiving-mortise.

WILLIAM N. RUMELY.

Witnesses:
Jos. M. Eberhardt,
Aug. B. Yenn.